United States Patent [19]
Dinkel et al.

[11] Patent Number: 5,902,014
[45] Date of Patent: May 11, 1999

[54] VENTILATED VEHICLE SEAT WITH A PLURALITY OF MINIATURE VENTILATORS

[75] Inventors: Emil Dinkel, Renningen; Ulrich Ebbeskotte, Althengstett; Eberhard Faust, Stuttgart; Gerald Jank, Tuebingen; Adam Mazzon, Sindelfingen; Karl Pfahler, Stuttgart; Peter Strache, Sindelfingen; Bernd Hansmann, Boeblingen; Harald Decker, Horb-Obertalheim, all of Germany

[73] Assignee: Daimler-Benz Aktiengesellschaft, Germany

[21] Appl. No.: 08/895,901

[22] Filed: Jul. 17, 1997

[30] Foreign Application Priority Data

Jul. 17, 1996 [DE] Germany ............ 196 28 698

[51] Int. Cl.⁶ ...................... A47C 7/74
[52] U.S. Cl. .............. 297/452.43; 297/180.1; 297/180.12; 297/180.13; 297/180.14
[58] Field of Search .......... 297/452.53, 180.1, 297/180.14, 180.12, 180.13

[56] References Cited

U.S. PATENT DOCUMENTS

| | | | |
|---|---|---|---|
| 3,136,577 | 6/1964 | Richard | 297/180.12 X |
| 3,638,255 | 2/1972 | Sterrett | 297/180.1 X |
| 4,335,725 | 6/1982 | Geldmacher | 297/180.12 X |
| 4,685,727 | 8/1987 | Cremer et al. | 297/180.14 |
| 4,695,091 | 9/1987 | Altmann et al. | 297/180.12 |
| 4,923,248 | 5/1990 | Feher | 297/180.1 |
| 4,946,220 | 8/1990 | Wyon et al. | 297/180.13 |
| 5,002,336 | 3/1991 | Feher | 297/180.13 |
| 5,013,302 | 5/1991 | Yu | 297/180.13 X |
| 5,516,189 | 5/1996 | Ligeras | 297/180.12 X |
| 5,564,144 | 10/1996 | Weingartner et al. | 297/452.53 X |
| 5,597,200 | 1/1997 | Gregory et al. | 297/180.13 |
| 5,715,695 | 2/1998 | Lord | 297/180.1 X |

FOREIGN PATENT DOCUMENTS

| | | |
|---|---|---|
| 16 54 400 | 1/1977 | Germany . |
| 39 03 303 A1 | 8/1990 | Germany . |
| 40 14 550 A1 | 11/1990 | Germany . |
| 2-33662 | 3/1990 | Japan . |
| 7-11962 | 2/1995 | Japan . |

*Primary Examiner*—Peter M. Cuomo
*Assistant Examiner*—Rodney B. White
*Attorney, Agent, or Firm*—Evenson, McKeown, Edwards & Lenahan, P.L.L.C.

[57] ABSTRACT

A vehicle seat has an upholstery which is integrated in both eat part and in the backrest. A ventilation layer is provided through which air can flow, and an air-permeable upholstery cover spans the surface facing the sitting person, as well as having devices for ventilating the ventilation layer. For improving the sitting climate comfort, which also includes a rapidly effective cooling of the seat surfaces heated by sun radiation when the vehicle is entered and the removal of the transpiration moisture, and also for avoiding disturbing air connection hoses between the vehicle seat and the air-conditioner, the ventilation layer is arranged on an upholstery layer. Devices for ventilating the ventilation layer have a plurality of electrically driven miniature fans integrated in the upholstery layer. One miniature fan respectively is arranged in an air duct penetrating the upholstery layer from the underside to the ventilation layer. The distribution of the air ducts takes place so that a uniform, area-wide ventilation of the ventilation layer is ensured.

20 Claims, 5 Drawing Sheets

VENTILATED VEHICLE SEAT WITH A PLURALITY OF MINIATURE VENTILATORS

This application claims the priority of 196 28 698.0, the disclosure of which is expressly incorporated by reference herein.

BACKGROUND AND SUMMARY OF THE INVENTION

The present invention relates to a vehicle seat, and more particularly, to having a seat part and a backrest, an upholstery which is integrated in at least one of the seat part and the backrest and which has a ventilation layer through which air can flow, the ventilation layer consisting of a large-meshed spaced knit, and which has an air-permeable upholstery cover spanning a surface facing a seat occupant, and devices for ventilating the ventilation layer.

Known ventilated vehicle seats are used for improving the sitting climate comfort when a parked vehicle is entered which is overheated as the result of extended sun radiation as well as for longer driving times.

In the known vehicle seat described in DE 39 03 303 A1, the devices for ventilating the ventilation layer, which is constructed as an indentation-proof support mat made of a large-meshed, irregular synthetic-thread knit, consists of three ray-shaped and curved tube connections made of an elastic material which are inserted into a central profile recess in the area of the rearward edge of the seat part and are connected by way of a central distributor to the blow-out opening of a vehicle-side fan. The supply of warm or cold air into the ventilation layer can be continuously regulated by a control flap. The bottom side of the upholstery which faces away from the breathing upholstery cover is provided with an air-impermeable covering. The fan delivers an air flow into the upholstery of the seat part and the backrest. The air flow flows through the ventilation layer and reaches the body surfaces of the sitting person through the pores of the upholstery cover.

The seat ventilation using air-conditioned air has the decisive disadvantage that, as the result of the adjustability of the vehicle seat for setting the seat position which is optimally adapted to the seat user, high-expenditure and extensive flexible air ducts are required for connecting the central distributor to the fan. In addition, air-conditioned air cooling is extremely sluggish so that no rapidly effective cooling of the body contact surfaces of the vehicle seat can be achieved in a vehicle seat which is overheated by parking in the sun. The blowing-in of precooled air in addition leads to the risk of a fast overcooling of individual body zones which is intensified in that the air flows in at the rearward area of the seat part or at the lower area of the backrest and causes the strongest cooling there.

DE 40 14 550 A1 describes a seat for achieving an effective removal of moisture which has penetrated into the upholstery cover as the result of the transpiration of the sitting person. A layer of the upholstery which is situated behind the upholstery cover and has a low air flow resistance in a central area of the backrest is connected with a suction blower. The suction blower is integrated into the backrest and carries away the suction air carrying the moisture through an opening in the backrest wall. The rearward side of the air-permeable upholstery layer facing away from the breathing upholstery cover is covered by a blocking layer which is made of an air-impermeable material and which, in addition, is used as a support for the spirals of an electric seat heater.

DE 16 54 400 B2 describes a seat composed of two plastic buckets. The surface of the bucket parts facing the body of the sitting person is perforated and the hollow space enclosed by the seat buckets is connected to a switchable fan supplying suction air or compressed air. As an alternative, the switchable fan is arranged within the hollow space between the bucket parts. Also, the compressed air can be heated to thus temper the seat buckets.

An object of the present invention is to improve a vehicle seat with a sitting climate comfort such that, on one hand, disturbing air connection hoses are avoided and, on the other hand, a rapidly effective cooling is ensured of seat surfaces heated considerably by sun radiation starting with the entering of the parked vehicle. A draft-free uniform cooling of the body contact zones of the sitting person when the seat is heated can be guaranteed by the present invention without the risk of damage to a person's health as well as the continuous carrying-away of the transpiration moisture generated by the sitting person.

This object has been achieved according to the present invention by providing that the ventilation layer covers an upholstery layer at least in the body contact area over the whole surface, in that the devices for ventilating the ventilation layer have a plurality of electrically driven miniature fans which are integrated in the upholstery layer and which are arranged in air ducts which penetrate the upholstery layer from the frontal side facing the ventilation layer to the rearward side facing away from the ventilation layer, and in that the air ducts are distributed in the upholstery layer in an arrangement which causes an area-wide ventilation of the ventilation layer which is as uniform as possible.

The vehicle seat according to the present invention has, among others, the advantage that, because of the arrangement of a plurality of miniature ventilators or fans directly in the upholstery, a large air throughput is achieved while the fan dimensions are small. This throughput will also cool upholstery heated by sun radiation within a short time down to a comfortable temperature. The ventilation air is taken out at the underside of the seat. That is, the take out of the ventilation air is in an area of the vehicle interior in which the lowest air temperature exists and generally remains below the average skin temperature of a human being at approximately 34° C. which considerably raises the effectiveness of the cooling. As the result of this large air throughput with an advantageously tempered air, excellent cooling of the vehicle seat is achieved also without the use of a cooling unit and the overcooking phenomena with respect to the sitting person which may be harmful to the person's health in the case of the cooled air are avoided. With the elimination of a cooling unit and the integration of the ventilators and fans into the vehicle seat itself, all disturbing flexible tubes are avoided.

The miniature fans or miniature ventilators also have the advantage that they can be arranged in the seat part and the backrest at various densities adapted to a transpiration activity of different intensities of the body regions of the sitting person. In addition, they may be controlled such that they run at different rotational speeds and/or that the time sequence of the rotational speed is varied corresponding to the momentary requirements. If a remote door locking system exists, the switching-on of the miniature fans can be coupled with the remote control so that the ventilation of the vehicle seat starts even before the vehicle is entered.

Moreover, the miniature fans can be switched from a blowing mode to a sucking mode so that, after entering the vehicle and taking the seat, it is also possible to remove moisture from the skin and clothing of the sitting person with the suction air. As the result of the ventilation layer, an absolutely draft-free cooling which is uniform over the body zones is ensured in the body contact surfaces of the vehicle seat so that there is no danger of catching a cold.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
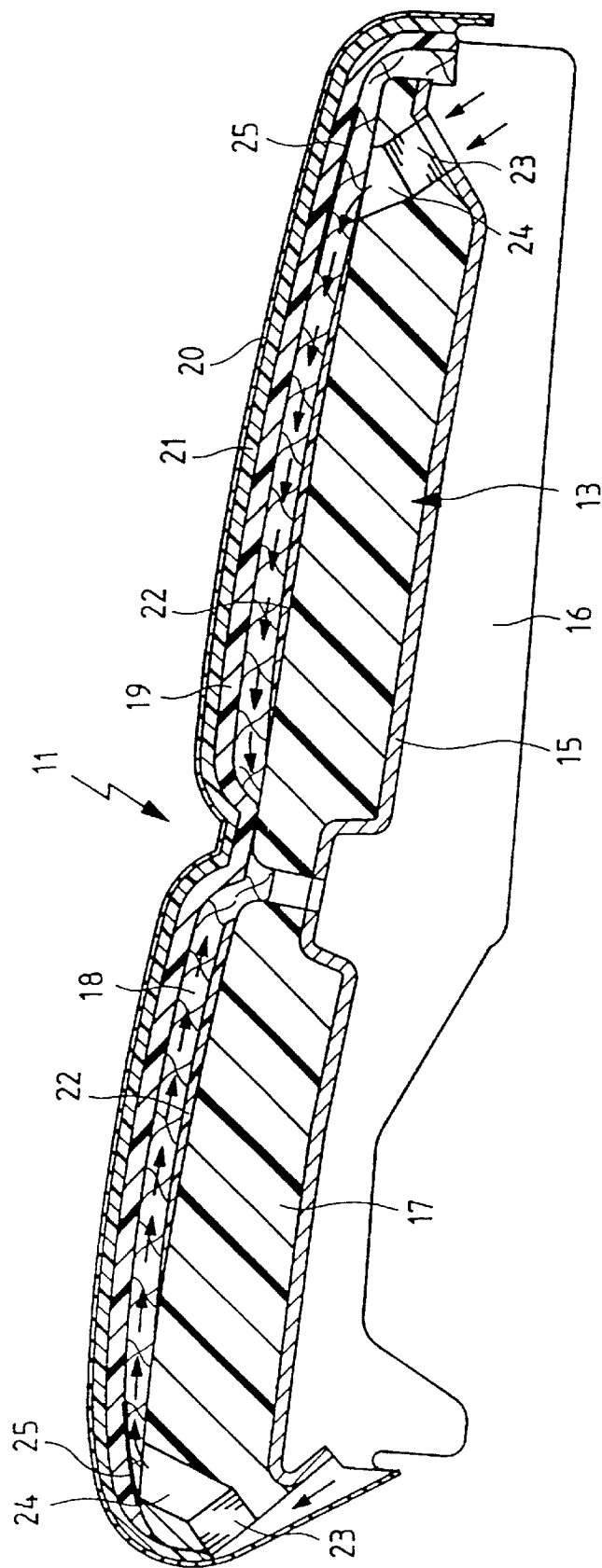
FIGS. 1 to 3 are schematic longitudinal sectional views respectively of three different embodiments of a seat part of a vehicle seat according to the present invention.
Figure 2:
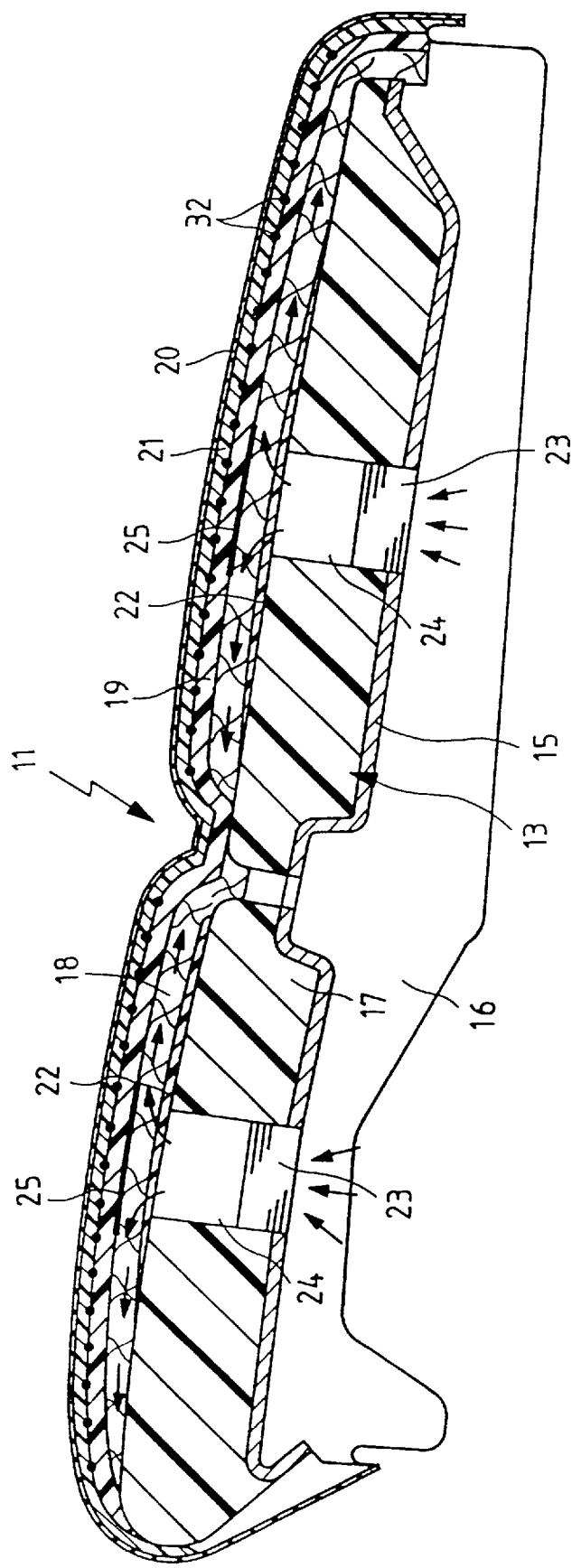
Figure 3:
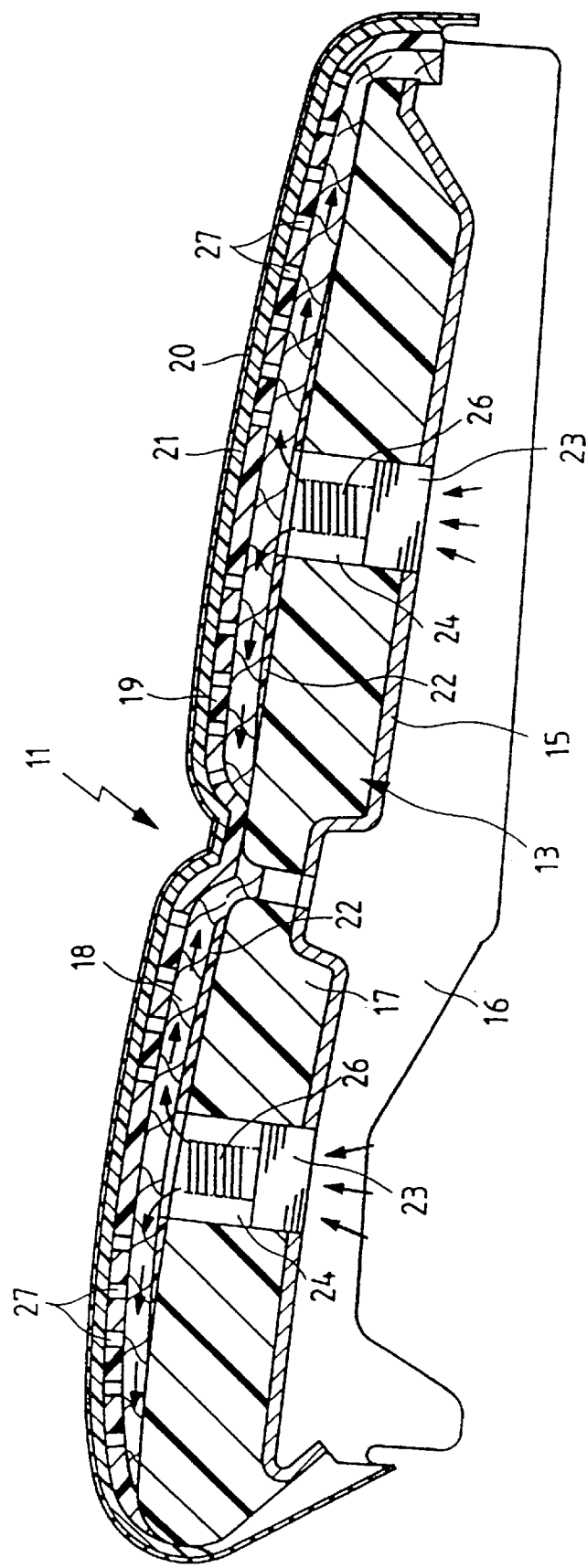

The illustrated vehicle seat in each of FIGS. 1 through 3 has a seat part 11 adjustably held on the vehicle floor and a backrest 12 which, for adjusting its inclination, is connected with the seat part 11 by way of a swivel locking device in a known manner. The seat part 11 and the backrest 12 (FIGS. 4 and 5) each have respective upholstery portions 13, 14.

With specific reference to the embodiment of FIG. 1, the upholstery 13 of the seat part 11 is fastened on an upholstery support 15 which is constructed as a spring core made of spring wire which is clamped in a frame 16. The upholstery 13 includes several layers. An upholstery layer 17 is made of rubberized hair or foamed material and rests on the upholstery support 15. A ventilation layer 18 made of a large-meshed, spaced knit which covers the upholstery layer 17 over its entire surface and through which air can flow. A pressure distribution layer 19 which rests on the ventilation layer 18 and can consist of a spaced knit, a nonwoven or an open-pored foam. An air-permeable upholstery cover 20 spans the surface facing the sitting person.

Between the upholstery cover 20 and the pressure distribution layer 19, a cover filling 21 is worked in, and a thin foam material or nonwoven layer 22 is inserted between the ventilation layer 18 and the upholstery layer 17. The filling 21 of the cover, which optionally also accommodates heat conductors of an electric seat heater, includes a layer of open-pored cut foam and/or of a wool nonwoven.

A plurality of electrically driven miniature ventilators or miniature fans 23 (schematically shown) are arranged in the upholstery layer 17 and take in air from the area of the vehicle interior situated below the seat part 11 and blow it into the ventilation layer 18. In the spaced knit of the ventilation layer 18, whose vertical "webs" stand in a wide-meshed and random manner, the air can dissipate in all directions and, when the seat is unoccupied, can flow through the upholstery cover 20 into the air space above the seat surface and as a result cause a fast cooling of the seat surface. When the seat part 11 is occupied, the air moves along in the spaced knit of the ventilation layer 18 and flows out again at the open ends of the upholstery 13. An air moisture gradient is thereby generated and removes the air moistened by the sitting person.

For blowing in the air, a plurality of air ducts 24 are constructed in the upholstery layer 17 and are each assigned to the miniature fans 23. The air ducts 24 penetrate the upholstery layer 17 from the frontal side facing the ventilation layer 18 to the rearward side facing away from the ventilation layer 18. One of the miniature fans 23 is arranged in each air duct 24 close to its end facing the rearward side of the upholstery layer 17. The air ducts 24 are distributed in the upholstery layer 17 such that a uniform, area-wide ventilation of the ventilation layer 18 is achieved.

In the embodiment of FIG. 1, the air ducts 24 are situated at the rearward and forward end of the seat part 11, specifically within one area of the upholstery layer 17 respectively which is separated by a quilting so that they have an essentially identical transverse distance from one another. Above each individual air duct mouth, an air-impermeable intermediate layer 25, such as a foil or a membrane, is arranged in a restricted area between the ventilation layer 18 and the pressure distribution layer 19. At the intermediate layer 25 the air flowing out of the air ducts 24 is deflected and therefore flows through the ventilation layer 18 in its longitudinal direction. As a result, a direct flow against the sitting person in the area above the air duct mouth is avoided so that no perceptible draft phenomena occur for the sitting person.

In the seat part illustrated in FIG. 2, the air ducts 24 with the miniature fans 23 situated therein are uniformly arranged in the area of the body contact surface in the upholstery layer 17. The air flows which enter the ventilation layer 18 at the air duct mouths are in principle aimed in the direction of the sitting person. These air flows are, however, completely or partially deflected in the direction parallel to the seat surface by an air-impermeable, intermediate layer 25 which has limited dimensions and is placed between the ventilation layer 18 and the pressure distribution layer 19. In addition, an electric seat heater is provided whose heating wires 32 are arranged between the compressed-air distribution layer 19 and the cover filling 21. Otherwise, the construction of the upholstery 13 corresponds to that in FIG. 1 so that the same components have the same reference symbols to describe them.

The present invention also contemplates combining the air duct arrangements in the seat part 11 according to FIGS. 1 and 2 with one another so that the arrangement of the air ducts 24 distributed over the body contact surface according to FIG. 2 is also placed in the upholstery 13 according to FIG. 1.

The upholstery 13 in the seat part 11 according to the embodiment illustrated in FIG. 3 corresponds largely to the upholstery 13 illustrated in FIG. 2. Furthermore, heater spirals 26 are arranged in the air ducts 24 and are connected by way of a common on/off-switch with an electric current source. The heater spirals 26 (schematically shown) are arranged behind the miniature fans 23. That is, in the blowing operation, the air blown into the ventilation layer 18 flows through the heater spirals 26 and, as a result, the heater spirals 26 are heated up when the heater is switched on.

For improving air permeability, the pressure distribution layer 19, which is constructed here as an open-pored cut foam, is perforated in a relatively dense screen, with the exception of the areas above the air duct mouths. In FIG. 3, the individual holes of the perforation are designated by the numeral 27. Because of the absence of the holes 27 in the restricted area above the air duct mouths, a deflection of the air is again achieved so that an air-impermeable intermediate layer, such as a foil or a membrane, can be eliminated in the seat part 11 according to FIGS. 1 and 2. The heater spirals 26, heat the air flowing out of the breathing upholstery cover 20 so that the conventional electric seat heating mats are not necessary.

Figure 4:
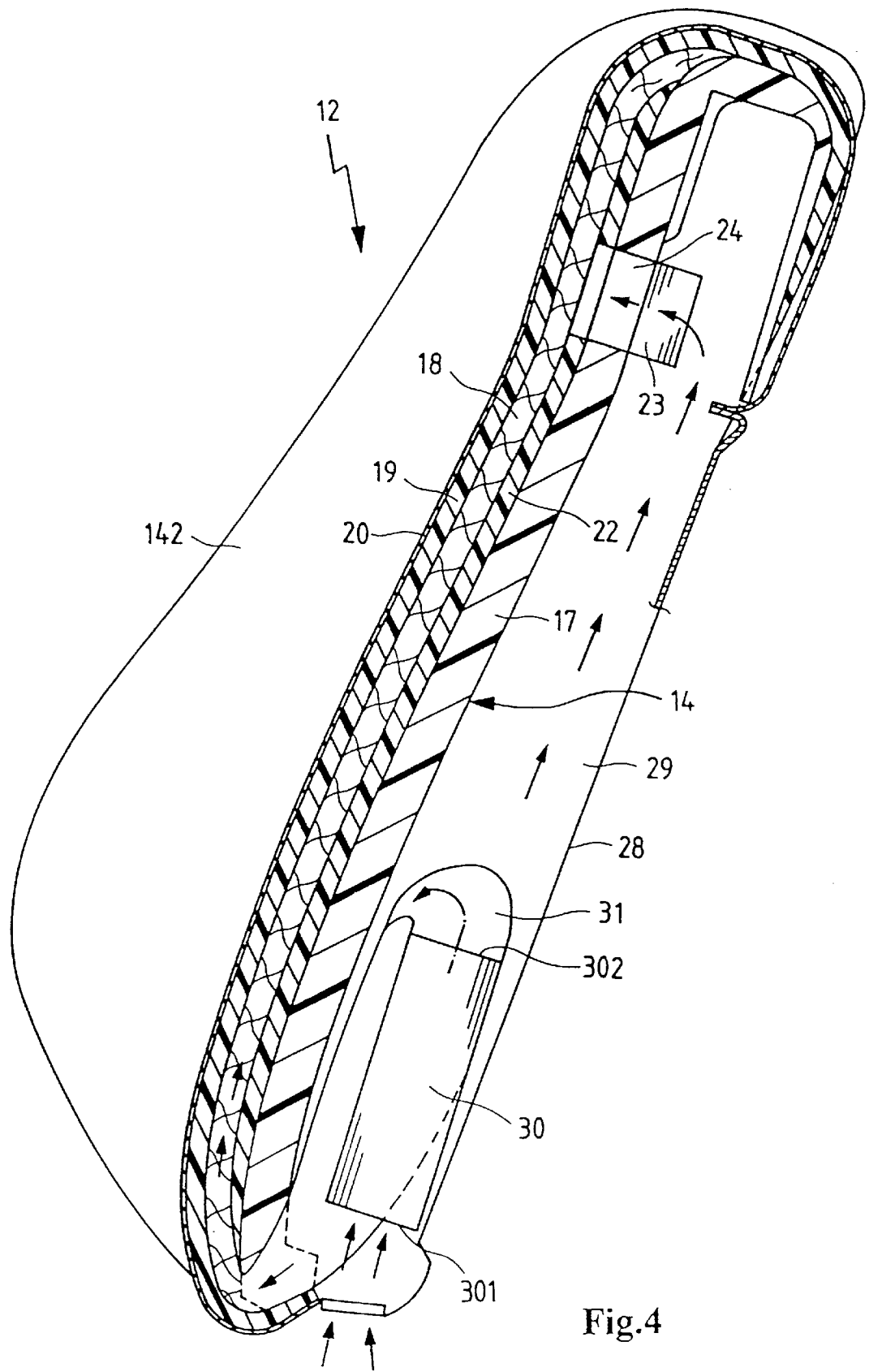
FIG. 4 is a schematic longitudinal sectional view of a backrest of a vehicle seat.
Figure 5:
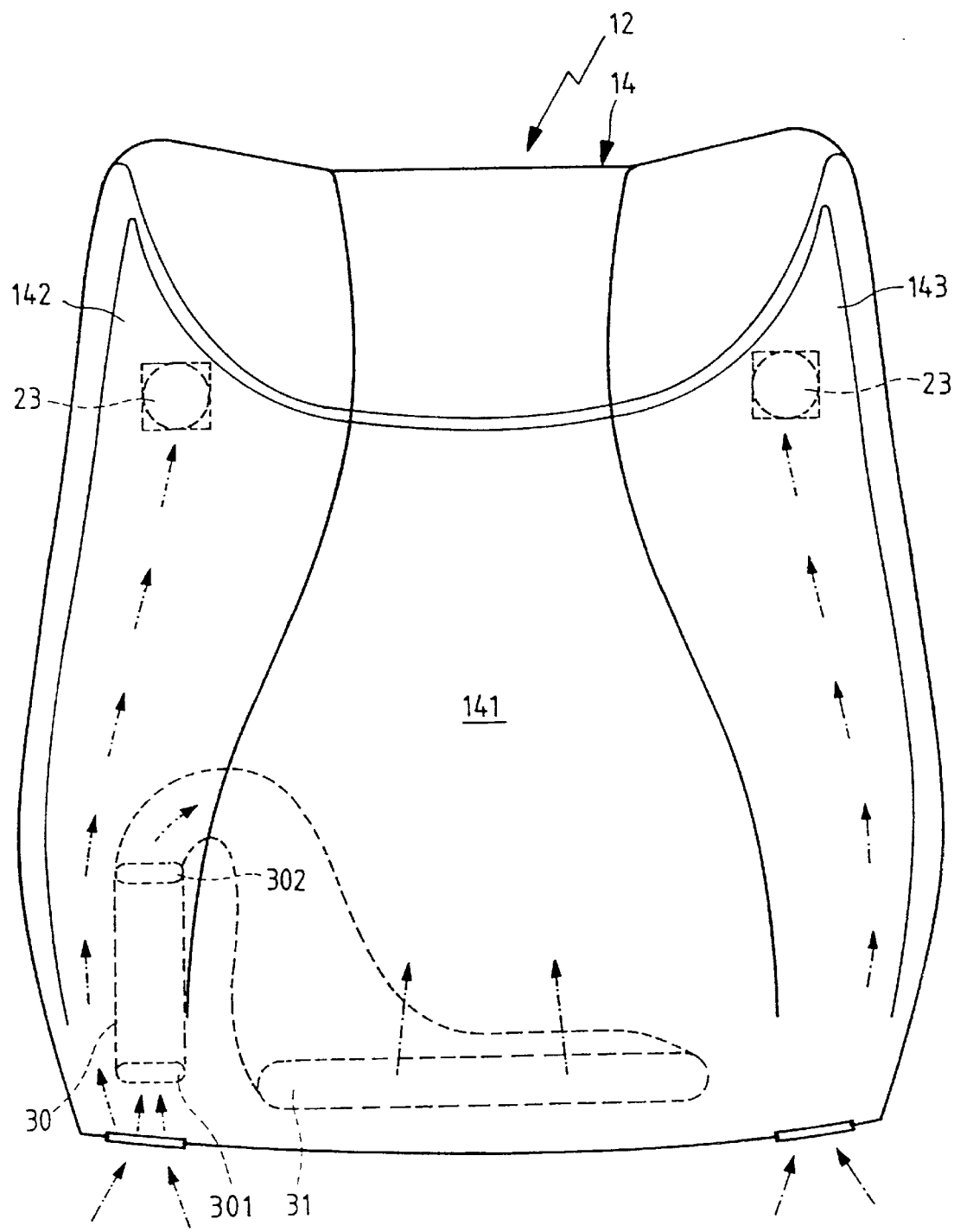
FIG. 5 is a schematic frontal view of the backrest shown in FIG. 4.

In the backrest 12 of the vehicle seat illustrated in FIGS. 4 and 5, the upholstery 14 is constructed with a backrest mirror or portion 141 and two lateral edge elevations or portions 142, 143. A hollow space 29 (FIG. 4) which is open on the lower end of the backrest 12 is provided between the upholstery 14 and an air-impermeable rear wall 28. In the hollow space 29, and specifically close to the lower end of the backrest 12, a central fan 30 is arranged whose intake opening 301 points downward toward the open end of the hollow space 29 and whose blow-out opening 302 is connected with a flexible duct 31. As in the case of the seat part 11, the upholstery 14 of the backrest 12 is fastened on an upholstery support, preferably a spring core clamped in a frame and has several layers. The several layers comprise an upholstery layer 17, a ventilation layer 18 which covers the upholstery layer 17 over the entire surface with the insertion of an air-impermeable foam material layer 22; a pressure distribution layer 19 arranged on the ventilation layer 18; and an air-permeable upholstery cover 20 spanning the surface pointing to the sitting person. The ventilation layer 18 is lengthened in the mirror area at the lower end by way of the upholstery layer 17 and is connected to the flexible duct 31.

In each edge elevation 142, 143, at least close to its upper end in the upholstery layer 17, an air duct 24 is arranged and houses a miniature fan 23. The one side of the air duct 24 leads into the hollow space 29 and the other side leads out on the ventilation layer 18. The foam material layer 22 is recessed in the area of the air duct mouth. The two miniature fans 23 supply the area of the edge elevations 142 and 143 with air, and the central fan 30 delivers air only into the ventilation layer 18 of the backrest mirror 141. As with the seat part 11, in the backrest mirror 141 and in the edge elevations 142, 143, the air flows through the ventilation layer 18 and, through the air-permeable pressure distribution layer 19 and the breathing upholstery cover 20, arrives on the surface of the backrest 12 where it dehumidifies corresponding body zones of the sitting person and optionally supplies them with heat. In the latter case, the central fan 30 is also equipped with a heater spiral which, together with the heater spirals 26 in the seat part 11 and in the edge elevations 142, 143, is switched on and off.

In order to avoid draft phenomena and a overcooling of sensitive body zones, the following control of the miniature fans 23 and of the central fan 30 is advantageous. When the door locking system is activated, for example, by a key or an infrared remote control, all fans 23, 30 are switched on to their highest stage for the blowing operation. In a vehicle which is heated by sun radiation while parked, air is therefore taken in from a relatively cool area below the vehicle seat and is blown through the upholstery 13, 14. After a short time, during which a cooling of the upholstery surface takes place from, for example, 80° to, for example, 40°, the fans 23, 30 are switched to a lower rotational speed automatically or by pressure on a button by the seat user who has entered in the meantime. If, when the air rate is reduced, the cooling is still too strong, for example, because the seat user, when entering already had moist skin or clothes as the result of perspiration, a further switching operation switches all fans 23, 30 to a still lower switching step or to a suction operation. This permits a long-term operation with a low removal of moisture which is nevertheless effective and comfortable.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle seat having a seat part and a backrest, an upholstery which is integrated in at least one of the seat part and the backrest and which has a ventilation layer of material through which air can flow, the ventilation layer consisting of a large-meshed spaced knit and which has an air-permeable upholstery cover spanning a surface facing a seat occupant, and devices for ventilating the ventilation layer, wherein the ventilation layer covers an upholstery layer at least in a body contact area over an entire surface thereof the ventilation devices comprising a plurality of electrically driven miniature fans integrated in the upholstery layer and arranged in air ducts configured to penetrate the upholstery layer from underneath the body contact area of the upholstery layer facing the ventilation layer the air ducts are so distributed in the upholstery layer to cause a uniform, area-wide ventilation of the ventilation layer which is as uniform as possible, and the ventilation layer material constructed and positioned over the air ducts to achieve deflection of the air and maintain flow of the air along a length of and transversely through the ventilation layer.

2. The seat according to claim 1, wherein the miniature fans in the air ducts are arranged close to an end thereof.

3. The seat according to claim 1, wherein a heater spiral is operatively arranged in the respective air ducts and are connectable by way of an on/off switch with an electric current source.

4. The scat according to claim 3, wherein the miniature fans in the air ducts are arranged close to an end thereof.

5. The seat according to claim 1, wherein an air-permeable pressure distribution layer is arranged between the ventilation layer and the upholstery cover and is selected from a group of materials comprising a spaced knit, a nonwoven and an open-pored foam.

6. The seat according to claim 5, wherein the pressure distribution layer is perforated, except for a restricted area situated above the individual mouths of respective air ducts, and the perforations are located close to each other.

7. The seat according to claim 5, wherein a heater spiral is operatively arranged in the respective air ducts and are connectable by way of an on/off switch with an electric current source.

8. The seat according to claim 5, wherein the pressure distribution layer is perforated, except for a restricted area situated above the individual mouths of respective air ducts, and the perforations are located close to each other.

9. The seat according to claim 1, wherein, in a restricted area above the individual mouths of respective air ducts, an air-impermeable intermediate layer is arranged on the top side of the ventilation layer which faces away from the air duct mouths.

10. The seat according to claim 9, wherein the intermediate layer is one of foil or membrane.

11. The seat according to claim 1, wherein the air ducts in the upholstery layer are arranged close to a forward and rearward end of the seat part and have the same transverse distance from one another.

12. The seat according to claim 11, wherein the miniature fans in the air ducts are arranged close to an end thereof.

13. The seat according to claim 12, wherein a heater spiral is operatively arranged in the respective air ducts and are connectable by way of an on/off switch with an electric current source.

14. The seat according to claim 12, wherein an air-permeable pressure distribution layer is arranged between the ventilation layer and the upholstery cover and is selected from a group of materials comprising a spaced knit, a nonwoven and an open-pored foam.

15. The seat according to claim 1, wherein the air ducts are uniformly distributed over the body contact area of the seat part.

16. The seat according to claim 1, wherein the upholstery of the backrest is constructed with a backrest portion and two lateral edge portions, and between the backrest upholstery and an air-impermeable rear wall, a hollow space is arranged to be open at a lower end of the backrest and with a central fan in a lower end of the hollow space, and a lower end of the ventilation layer is lengthened at least in an area of the backrest portion beyond the upholstery layer and is connected to a flexible duct connected with an outlet of the central fan.

17. The seat according to claim 16, wherein at least one backrest air duct leads into the hollow space with a miniature fan arranged therein and is assigned to each of the lateral edge portions.

18. The seat according to claim 17, wherein the miniature fans in the air ducts are arranged close to an end.

19. The seat according to claim 18, wherein a heater spiral is operatively arranged in the respective air ducts are connectable by way of an on/off switch with an electric current source.

20. The seat according to claim 19, wherein an air-permeable pressure distribution layer is arranged between the ventilation layer and the upholstery cover and is selected from a group of materials comprising a spaced knit, a nonwoven and an open-pored foam.

* * * * *